United States Patent [19]
Robertson

[11] 3,981,571
[45] Sept. 21, 1976

[54] SPOOLING ARRANGEMENTS FOR ENDLESS BAND MATERIAL

[75] Inventor: Penrose David Robertson, London, England

[73] Assignee: Westrex Limited, London, England

[22] Filed: Apr. 4, 1975

[21] Appl. No.: 565,170

[52] U.S. Cl............................. 352/125; 352/128; 242/55.16
[51] Int. Cl.² ........................................ G03B 23/00
[58] Field of Search ............ 352/125, 126, 127, 128; 242/55.16, 55.17

[56] References Cited
UNITED STATES PATENTS
1,759,024  5/1930  Selbach ............................ 242/55.16

Primary Examiner—Monroe H. Hayes
Attorney, Agent, or Firm—Donald J. Ellingsberg

[57] ABSTRACT

An arrangement for spooling endless band material, particularly for the repeated projection of the full length of cinematograph film required for a complete programme formed as an endless loop, having two double spools each able to carry two film spirals. In a first half of the projection operation Spool 1, Spiral 1, is fed through the projector and taken up as Spool 2, Spiral 1. Simultaneously, Spool 1, Spiral 2, is directly rewound as Spool 2, Spiral 2. Both spools are then reversed and, in the second half of the projection operation, Spool 2, Spiral 2, is fed through the projector and taken up as Spool 1, Spiral 2, and Spool 2, Spiral 1, is directly rewound as Spool 1, Spiral 1. The initial state is re-established and the projection operation is continuously repeatable without rethreading the projector.

9 Claims, 30 Drawing Figures

SPOOLING ARRANGEMENTS FOR ENDLESS BAND MATERIAL

This invention relates to spooling arrangements for endless band materials, and particularly, but not exclusively, to spooling arrangements for cinematographic film.

The general trend in cinemas is towards automation of the projection process. In arrangements which have been proposed, a complete programme of film is spliced to form one continuous length of film, and with the aid of a "plate" the film is projected in such a way that rewinding at the end of a performance is unnecessary.

A cueing system, driven from the projector, may be arranged to automatically dim the lights, open and shut the curtains, rotate the lens turret and perform such other operations as may be required. However, with such an arrangement, it is necessary to re-thread and lace up the projector at the end of each performance and, in the case of a multiple cinema this can lead to considerable work.

One object of the present invention is to provide an improved spooling arrangement for endless band material, such as cinematographic film, in which this disadvantage is overcome, or reduced.

Accordingly, the present invention provides an arrangement for spooling endless band material, and for controlling the said band material during a transport operation by which the entire length of the said band material is transported past a fixed station, comprising a first double spool adapted to receive and hold a loop of the band material and to carry substantially the whole length thereof in two spirals of the band material laterally spaced-apart, a second double spool adapted to receive and hold a loop of the band material and to receive and carry the band material from the first double spool in two spirals of the band material laterally spaced-apart, motor means for controlling the first double spool for rotation in the pay-off sense of the band material wound thereupon, during a first half of the said transport operation, and in the take-up sense during the second half of the transport operation, motor means for controlling the second double spool for rotation in the take-up sense for the band material during the first half of the said transport operation and in the pay-off sense during the second half of the transport operation, a first system of band-supporting guide members fixed in position relatively to the first and second double spools, a second system of band-supporting guide members cooperating with said first system of guide members and movable with respect thereto from first positions during the first half of the said transport operation to second positions during the second half of the transport operation, the said band-supporting guide members being positioned, in the first said positions of the movable guide system, for guiding said band material from a first said spiral on the first double spool to the said fixed station and from the fixed station onto a first spiral on the second double-spool and also for guiding said band material from the second spiral on the first double-spool onto a second spiral on the second double-spool, the said band-supporting guide members being re-positioned, in the second said positions of the movable guide system, for guiding said band material from the said second spiral on the second double-spool to the said fixed station and from the fixed station onto a second spiral on the first spool and also for guiding said band material from the first spiral on the second double-spool to a first spiral on the first double-spool.

In order that the invention may readily be carried into practice, two embodiments thereof will now be described in detail, by way of example, with reference to the accompanying drawings, in which:

FIG. 1 is an end elevation view of one hub of a pair;

FIG. 2 is a perspective view of a pair of hubs;

FIG. 3 is a plan view of the pair of hubs of FIG. 2 in relation to a cinematograph projector;

FIG. 4 is a further plan view similar to FIG. 3;

FIG. 5 is a plan view showing two pairs of hubs, as shown in FIG. 2, at one stage of winding and unwinding operation;

FIGS. 6, 7, 8 and 9 are views, similar to that of FIG. 5, showing successive later stages of winding and unwinding operation;

FIG. 10 is a side elevation view of a quadruple-spool assembly;

FIG. 11 is an end elevation view of the assembly of FIG. 10;

FIG. 12 is a side elevation view of a swing arm assembly, with the face plate removed;

FIG. 13 is a plan view of the swing arm assembly of FIG. 12 with the face plate in position;

FIG. 14 is a side elevation view of a double-spool for holding cinematograph films;

FIG. 15 is an end elevation view of the double-spool of FIG. 14;

FIG. 16 is a side elevation view of a film pick-up arm, forming a part of the double-spool of FIG. 14;

FIGS. 17, 18 and 19 are views similar to that of FIG. 16 showing successive positions of the pick-up arm during its cycle of operation;

FIGS. 20 to 28 are side elevation views of the swing arm assembly, similar to the view of FIG. 12, but with the face plate in position, showing successive positions of the swing arms during operation.

FIG. 29 is a further side elevation view of the swing arm assembly, showing more particularly its relationship to the two double-spools of the apparatus; and FIG. 30 is an end elevation view of the swing arm assembly and one double-spool of FIG. 29.

Throughout the FIGS. 1 to 9 and throughout the FIGS. 10 to 30, the same elements are indicated by the same reference numerals. In the two groups of Figures, similar elements have the same reference numerals.

Referring, first, to the explanatory diagrams of FIGS. 1 to 9, the mode of operation of the spooling arrangement of the invention will now be described, starting with the loading of the hubs of the arrangement. However, it should be understood that the loading operation to be described is explanatory only since, in practice, the initial loading operation would not necessarily be performed in this manner.

Figure 1:
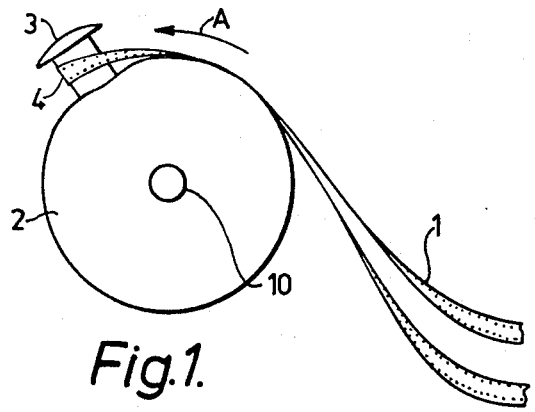
FIGS. 1 to 9 are diagrams referred to in the description of the operation of spooling arrangements according to the invention, more particularly.
Figure 2:
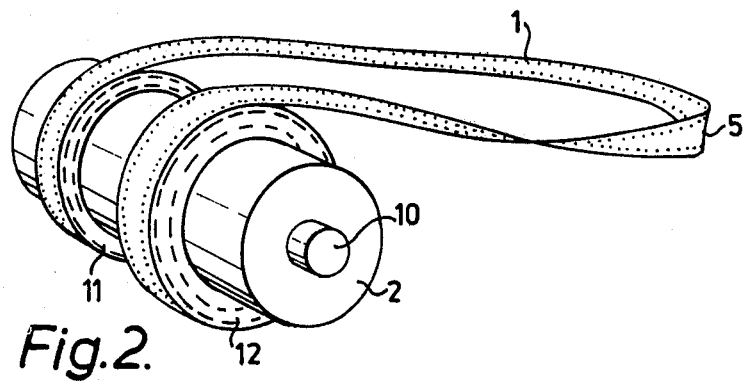

Consider, first, a length of film 1, many thousands of feet in length, lying unwound in a bin not shown, with the beginning and end of the film spliced together, so as to form an endless band. If one frame of the film 1 is withdrawn from the bin it will create a U-shaped loop 4 of film with the two arms of the loop 4 lying flat on the face of the hub 2 in parallel spaced-apart relationship and leading back into the bin. As shown in FIG. 1, this loop 4 drawn to the centre of a wide hub 2 is secured around a pin 3 on the hub 2. The hub 2 is now rotated about its axis 10, in the direction of the arrow A, so that the entire loop of film 1 is wound onto the hub 2 to form two equal spirals 11 and 12, spaced-apart, on the hub, as is shown in FIG. 2.

When almost all the film 1 is wound onto the hub 2, a second loop, shown at 5, with the arms of the loop leading to the spirals 11 and 12 on the hub, will be formed.

Figure 3:
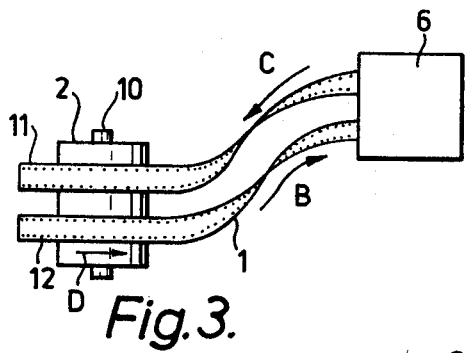

As shown in FIG. 3, the loop 5 is fed to and laced up into a cinematograph projector 6.

The direction of film feed to the projector 6 is shown by the arrow B and the direction of film take-up from the projector is shown by the arrow C. The hub 2 is assumed to be rotated in the direction shown by arrow D.

Figure 4:
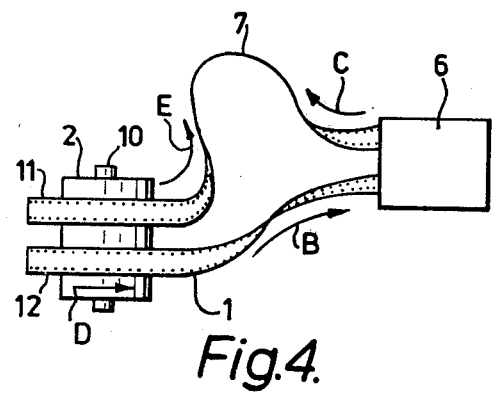
Figure 5:
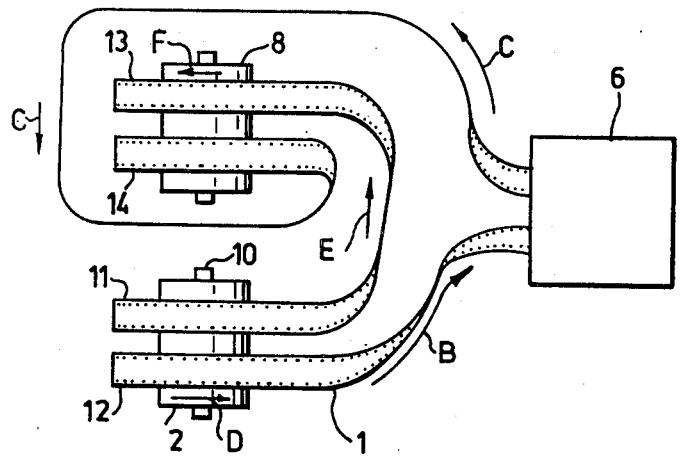

A third loop 7, shown in FIG. 4, is then formed from the length of film between the hub 2 and the return side of the projector 6. As shown in FIG. 5, this loop 7 is then attached to the centre of a second hub 8 in similar manner in which the loop 4 was attached to the hub 2, FIG. 1.

Any slack in the film 1 on the feed side can be taken up by running the projector 6 momentarily, and the apparatus is now ready for operation.

A constant driving torque is applied to the hub 8, in the direction of the arrow F, so as to maintain tension in the return arm from the projector. With the projector running, film 1 is wound off from the outside of spiral 12 of hub 2 towards the projector 6, as may be seen in FIG. 5, and film will be wound onto a spiral 14, of hub 8, from the projector 6. At the same time film is wound directly from the spiral 11 of hub 2, to a spiral 13 of hub 8.

The arrangement described so far with reference to FIGS. 1 to 5, preserves symmetry between the two hubs 2 and 8, but necessitates running the return arm of the film from the projector 6 round to the back of the hub 8, as shown by the arrows C, to prevent crossing of the two arms.

Figure 6:
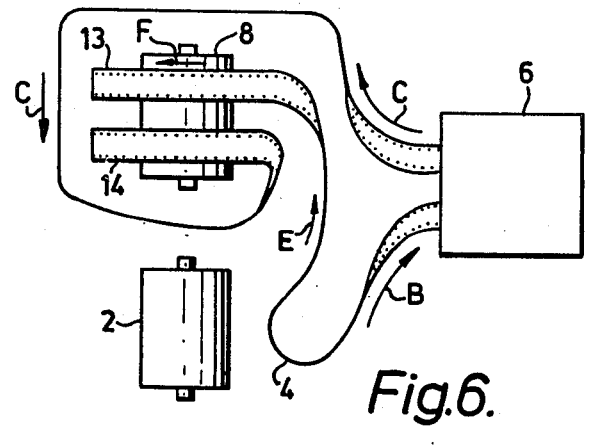
Figure 7:
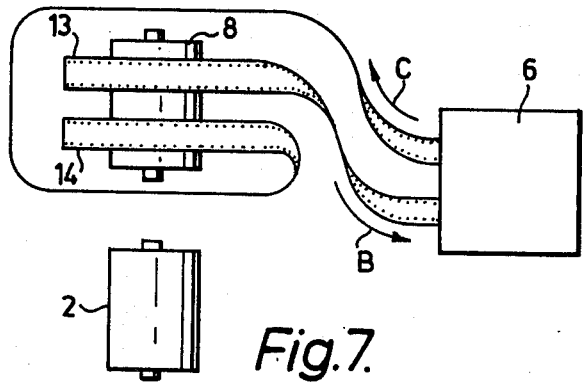

Eventually, all the film 1 will be wound off both spirals 11 and 12 of hub 2 and onto hub 8. The film loop 4 disengages from the pin 3 in hub 2, as shown in FIG. 6. The initial loop 4 is taken up in the direction of the arrows B and E of FIG. 6 to produce the condition shown in FIG. 7.

Figure 8:
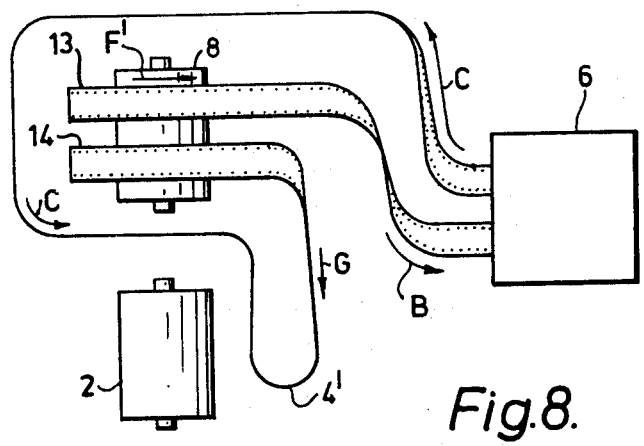
Figure 9:
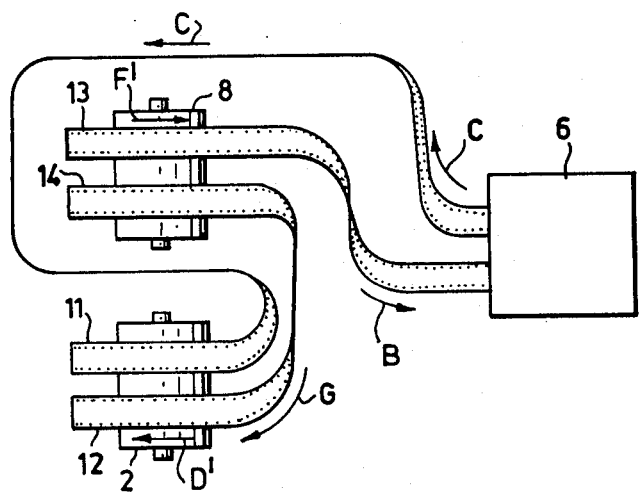

The torque on hub 8 is then relaxed to enable film to be drawn off spiral 13 of hub 8 and fed to projector 6, by rotation of hub 8 as shown by the arrow F' of FIG. 8. As this is done, film is fed from the return side of the projector, arrow C, and the spiral 14 on hub 8, arrow G, as shown in FIG. 8. This length of film then forms a further loop 4' which is again attached to pin 3 at the centre of hub 2. The film is then wound from hub 8 spiral 13 to the projector 6 and from spiral 14 to hub 2, see FIG. 9, in the same manner as from hub 2 to hub 8 previously.

So far, a half cycle of operations has been completed. The process continues in reverse to that shown in FIGS. 5 to 9.

The hub 2 is driven in the opposite direction of rotation, as shown by the arrow D', whereby spiral 11 is reformed by film fed from the projector, arrow C, and spiral 12 is reformed by film fed from the spiral 14 of hub 8, arrow G.

When this is completed, a whole cycle of operations will have been completed and the film from spirals 13 and 14, hub 8, will have been wound off to the projector 6 and to spiral 12, hub 2, respectively. The rotation of both hubs is again reversed to reform loop 7 and the conditions of FIG. 5.

From the foregoing description of operation with reference to the diagrams, FIGS. 1 to 9, it will be realised that the physical relationship of the hubs 2 and 8 to each other and to the projector 6 is limited only by the practical requirement of feeding the film 1 to and from the hubs, and this is controlled by pulleys and film guides which are not shown in the diagrammatic figures, for simplicity. Further, cheeks, not shown, are required to support the spirals at one or both sides.

One practical embodiment of the invention will now be described, by way of example, with reference to FIGS. 10 to 15, particularly, and the manner of operation will be described with reference to FIGS. 16 to 30, particularly.

Figure 10:
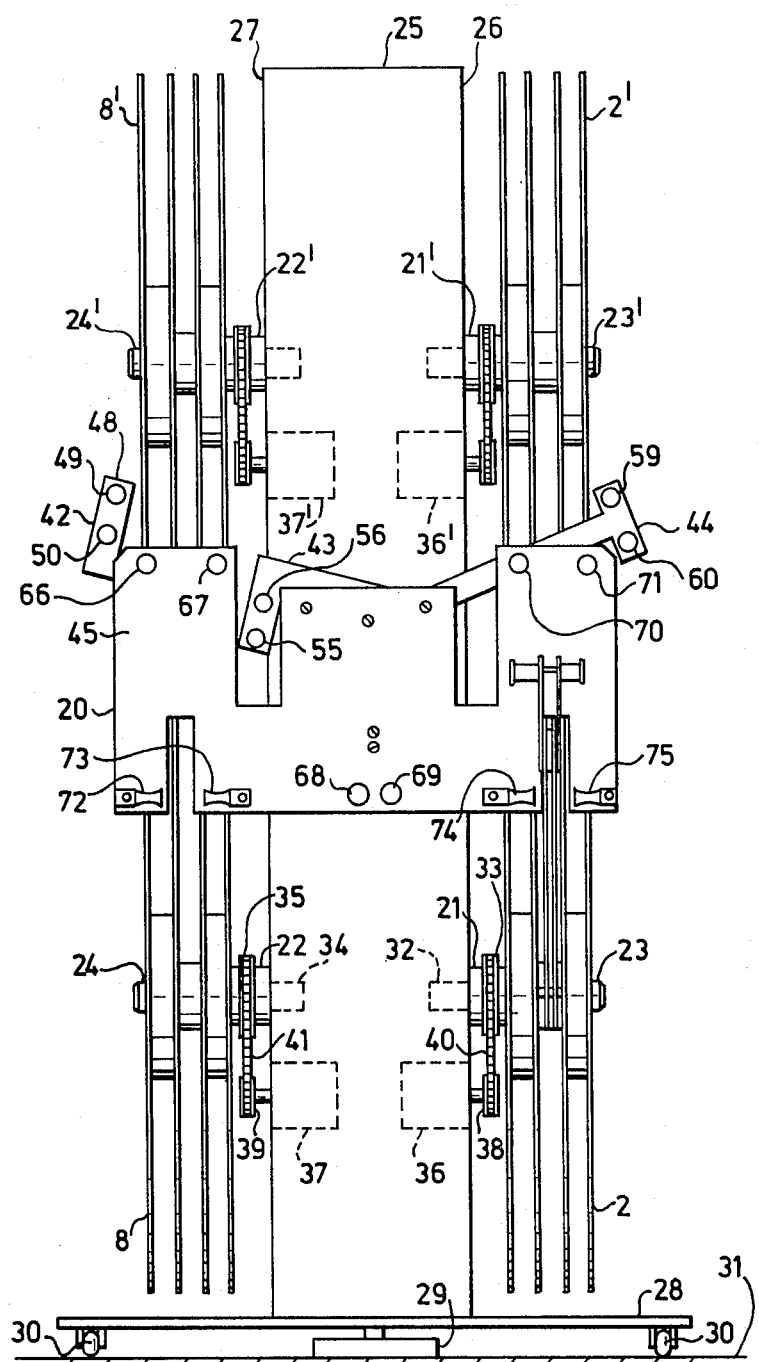
FIGS. 10 to 30 are views of one practical embodiment of the invention, showing the operation at various stages, more particularly.
Figure 28:
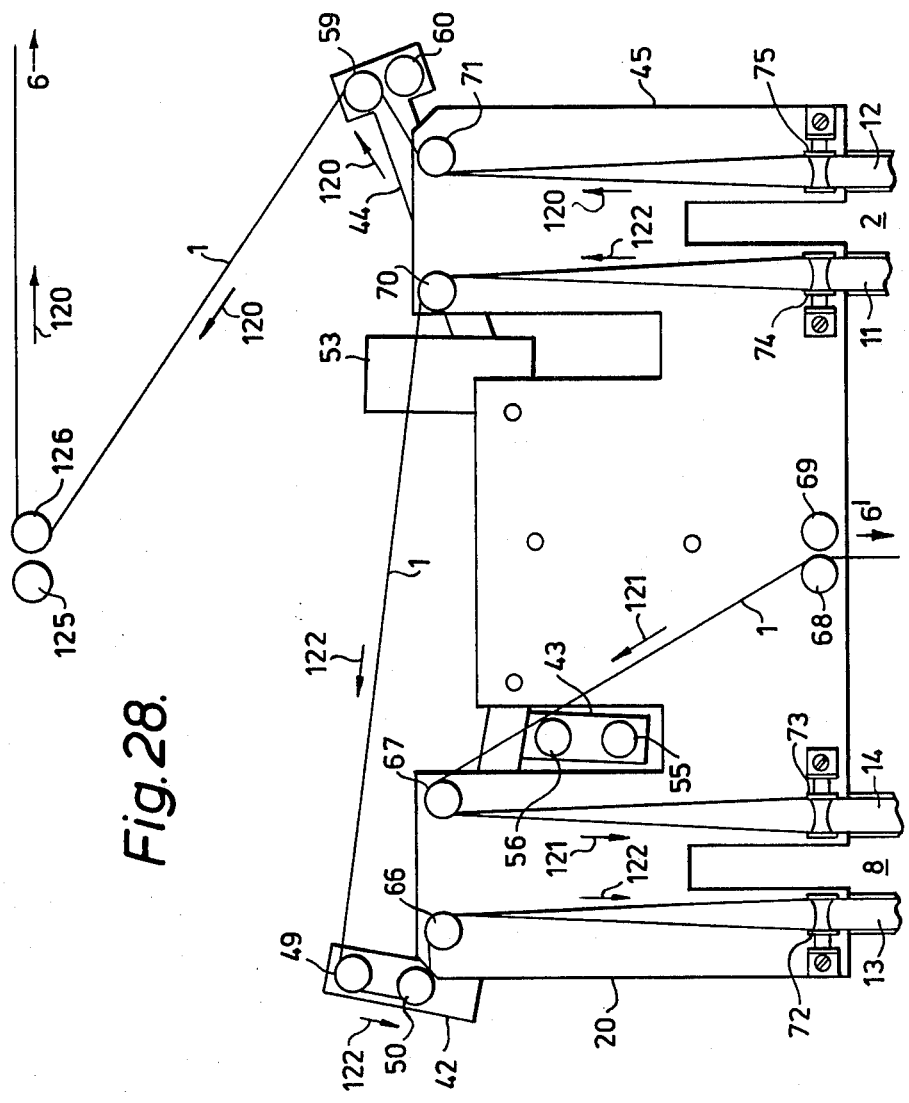
Figure 29:
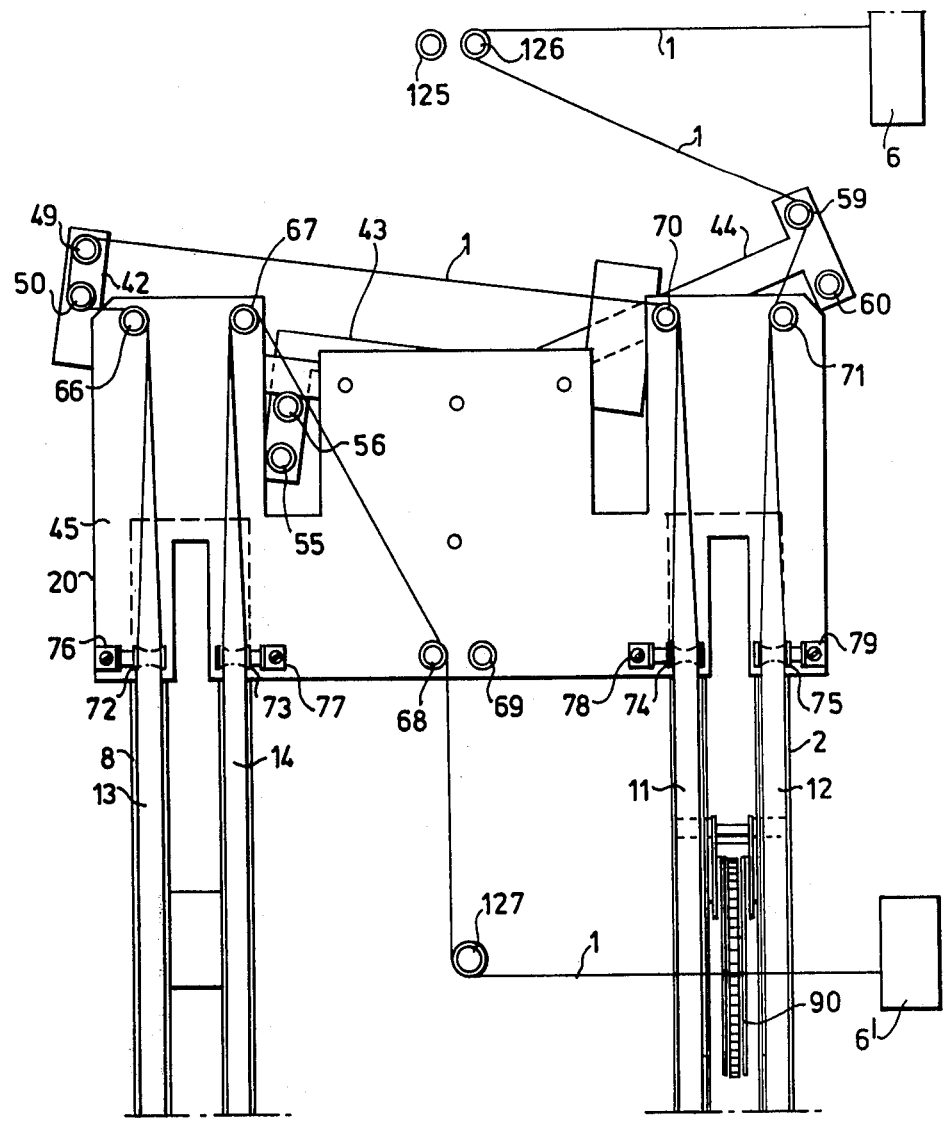

Referring to FIG. 10, there is shown an arrangement in which the two hubs 2 and 8 of FIGS. 1 to 9 are each replaced by double, large-diameter film spools, generally referenced 2 and 8, adapted to carry film spirals 11, 12 and 13, 14 respectively, see FIG. 29. Film in the film path, being fed from or taken up onto the said film spirals, is indicated generally at 1. The cinematograph projection apparatus is not shown in detail but is indicated, in FIG. 29, by the boxes 6 and 6' and in FIGS. 20 to 28 by the arrows referenced 6 and 6'.

It will be noted, for example from FIG. 10, that this embodiment has two pairs of double spools, eight film spools in all, not solely the one pair of double spirals shown in FIGS. 5 to 9. The purpose, in this practical embodiment is that while the entire length of film for a current series of performances may be stored on one double spool of, say, the lower pair of double spools 2 and 8, the entire length of film for the next following series of performances may be wound and stored in readiness on one of the upper pairs of double spools 2' and 8'.

Figure 11:
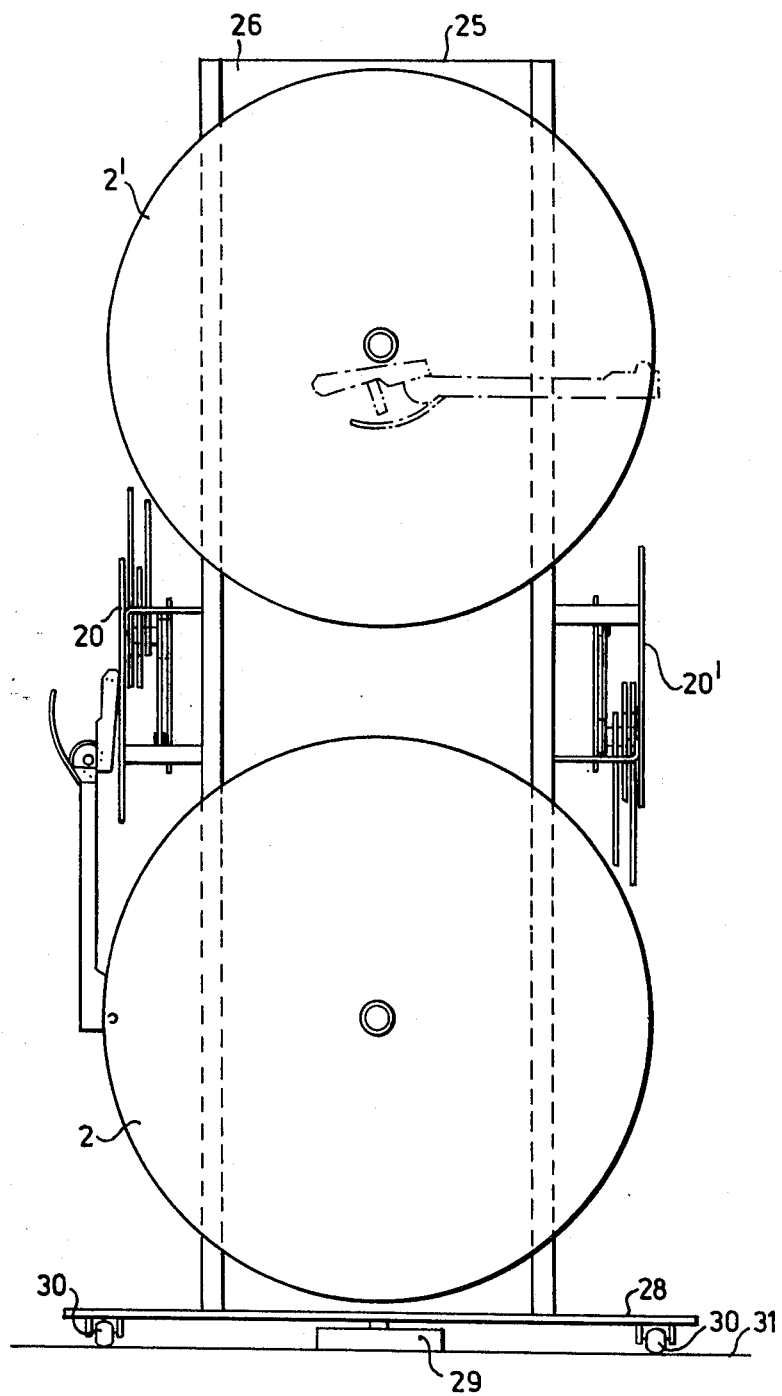

The present invention may be fully described by reference to either the upper or the lower pair of double spools only. Associated with each pair of double spools is a swing arm assembly. The swing arm assembly shown in the view of FIG. 10, and generally referenced 20, is associated with the lower pair of double spools 2 and 8 and hence it will be clearer to describe the manner of operation of the invention with respect to this lower pair of double spools. In the view of FIG. 11, the swing arm assembly 20 is shown at the left. It will be noted that a similar swing arm assembly 20' inverted relatively to the assembly 20, associated with the upper pair of double spools 2' and 8', is shown at the right of the drawing.

Referring again to FIG. 10, the double spools 2 and 8 each constitutes a single assembly, particularly described with reference to FIGS. 14 and 15, releasably mounted on spindles 21 and 22, respectively, and optionally secured by lock nuts 23 and 24, respectively. The upper pair of double spools 2' and 8' are mounted in the same manner, as is indicated by the same references primed.

The double spools of the upper and lower pairs are mounted on opposite faces of a central rack, shown generally at 25. The rack 25 is of standard 19 inches width, in the view of FIG. 11, and of box construction having one face panel 26, FIG. 11, which carries the spools 2 and 2' and an opposite face panel 27 which carries the spools 8 and 8'.

The rack 25 is mounted on a circular baseplate 28 which is centrally pivoted at 29 and further supported by peripheral castors 30, so that the entire assembly is free-standing and rotatable about pivot 29 on a floor 31.

Spindle 21 is carried in a bearing 32 and itself carries a pulley 33. Spindle 22 is carried in a bearing 34 and itself carries a pulley 35. Spindles 21 and 22 are respectively driven by torque motors 36 and 37 by way of driving pulleys 38 and 39 and driving belts 40 and 41, which drive pulleys 33 and 35, respectively. Upper spindles 23' and 24' are similarly mounted and driven by torque motors 36' and 37', respectively.

Figure 12:
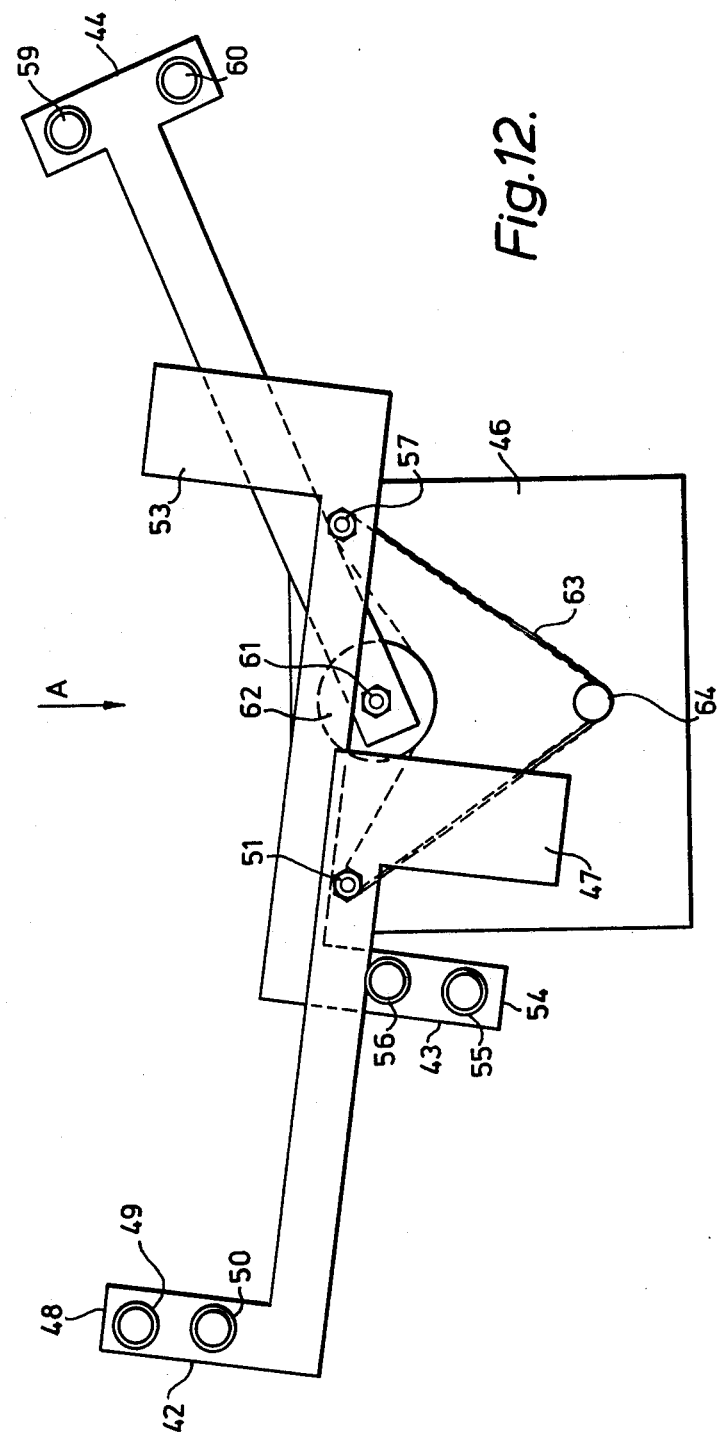
Figure 13:
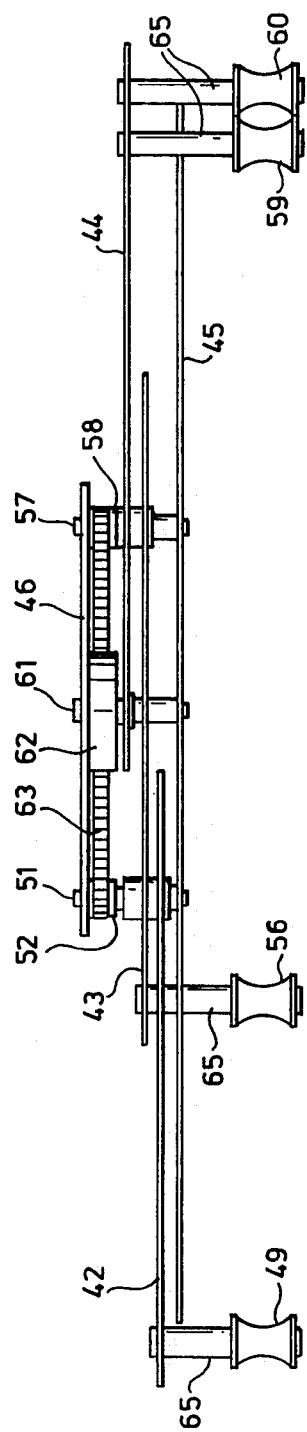

The construction of the swing arm assembly 20 of FIG. 10 will be described with reference to FIGS. 12 and 13, also. The swing arm assembly 20 comprises swing arms 42, 43 and 44 which are pivotably mounted between a face plate 45 and a back plate 46, the face plate 45 being removed for clarity in the view of FIG. 12. Arm 42 is L-shaped, with a counter-balance mass 47, the cranked part 48 of the arm carrying film pulleys 49 and 50. The arm 42 is fixed to a shaft 51 which extends through and has bearing in face plate 45 and back plate 46 and also carries a pulley 52.

Arm 43 is L-shaped, with a counter-balance mass 53, the cranked part 54 of the arm carrying film pulleys 55 and 56. The arm 43 is fixed to a shaft 57 which extends through and has bearings in plates 45 and 46 and also carries a pulley 58. Arm 44 is T-shaped, the head carrying film pulleys 59 and 60. The arm 44 is fixed to a shaft 61 which extends through and has bearing in plates 45 and 46 and also carries a pulley 62.

All pulleys 52, 58 and 62 are toothed and carry a toothed belt 63, which passes over a free pulley 64, so that when one arm 42, 43 and 44 is pivoted, all three arms pivot substantially in unison, in the manner later to be described. It will be noted that all the film pulleys 49, 50; 55, 56 and 59, 60 carried by the arms 42, 43 and 44 respectively, are carried on spindles 65 by which the film pulleys are stood off from the planes of the respective arms and are aligned in a plane common to further film pulleys 66, 67; 68, 69; 70 and 71, see FIG. 10, which further pulleys are mounted upon the swing arm assembly face plate 45. Two further pairs of film pulleys 72, 73 and 74, 75 are mounted on the assembly face plate 45, with their axes substantially aligned with the pulleys 66 to 71 and with their centres aligned, respectively, with film spirals 13 and 14 on the double spool 8 and with film spirals 11 and 12 on the double spool 2, see FIG. 29. The film pulleys 72 to 75 are, respectively, freely rotatably mounted from the face plate 45 by right-angle brackets 76, 77, 78 and 79, referenced solely in FIG. 29.

The double spool assemblies 2, 8, 2' and 8'' are identical and the construction will be described with reference to FIGS. 14 and 15. The assembly, generally referenced 2 in both figures, comprises four, circular cheeks 80, 81, 82 and 83 mounted in parallel planes on a central hub 84. The pair of cheeks 80, 81 are spaced-apart by a core 85 to accommodate the width of the cinematographic film to be projected, assumed in this example to be 35 millimetre film. The pair of cheeks 82, 83 are similarly spaced-apart by a core 86.

The inner two cheeks 81 and 82 are cut away in symmetrical curves 87, 88, see FIG. 14, to permit a pick-up arm 90 to pivot outwardly in the manner to be described later herein.

The pick-up arm 90, also clearly shown in side view in FIGS. 16 to 19 and in an end view in FIG. 29, comprises a framework arm with face members 91 pivoted about a spindle 92 carried by the cheeks 81 and 82 near to the periphery thereof. The spindle 92 carries a small pulley 93 fixed on the spindle 92. At the free end of arm 90, a larger pulley 95 is carried on a spindle 94. Both pulleys 93 and 95 are toothed and carry a toothed belt 96, whereby pulley 95 is rotated as the arm 90 pivots about the spindle 92, the angular rotation of pulley 95 being reduced in the diameter ratio of the two pulleys 92, 95.

The belt 96 is also carried around free pulleys 97 and 98 to maintain the tension of belt 96.

Figure 19:
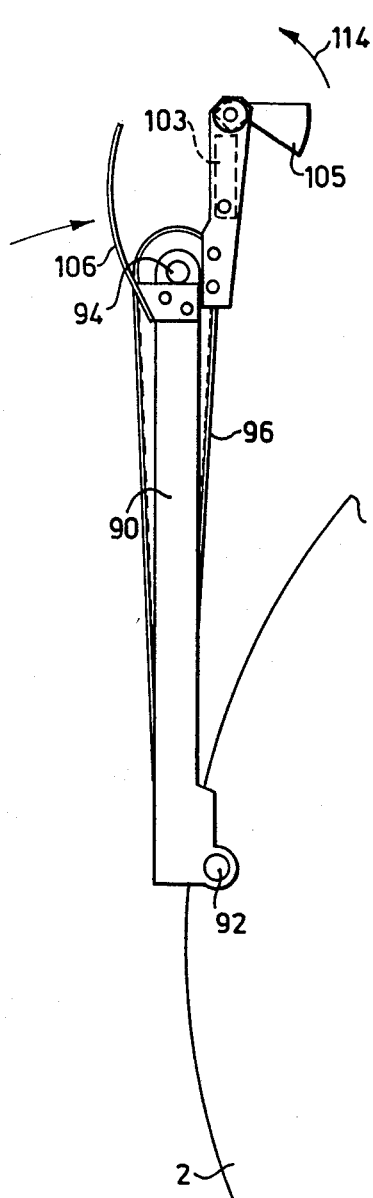
Figure 18:
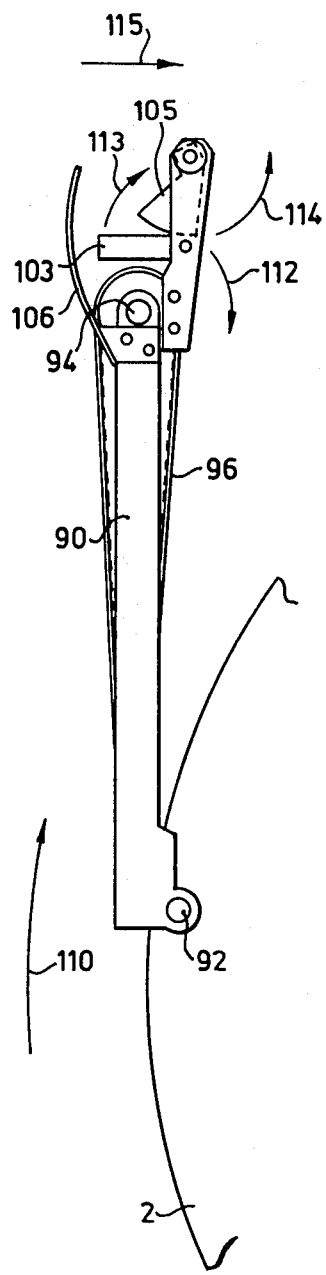

The pulley 95 has secured thereto an offset arm 99 which carries at its free end a pair of transverse spindles 100 on which are mounted film pulleys 101 and 102. The centres of pulleys 101 and 102 are aligned, respectively, with the centres of cheek pairs 80, 81 and 82, 83, as shown in FIGS. 15 and 29. The offset arm 99 also carries, approximately midway of its length, a film loop retaining finger 103 which has a curved film-loop receiving face and which pivots about a spindle 104. At the end of the offset arm 99, pivoted on the axis of film pulleys 101, 102, is a film loop retaining cam 105 which holds the film loop against the finger 103. In the position of the pick-up arm 90 in which it is pivoted into the centre of the double spool 2, as shown in the view of FIGS. 14 and 15, a short, double, arcuate cover 106, which is mounted from the free end of pick-up arm 90, covers cut-away portions of the cores 85 and 86, as shown particularly in FIG. 14. At the outwardly pivoted position of the pick-up arm 90, as shown in FIGS. 18 and 19, the film loop retaining cam 105 also serves to lock the swing arm 90 to the face plate 45 of the swing arm assembly 20.

Before commencing the description in detail of the manner of operation of the apparatus of FIG. 10, it will assist to summarize the function of the various units. Thus, the double spools 2 and 8 of FIG. 10 correspond to the hubs, correspondingly referenced, of FIGS. 1 to 9. The entire length of film 1 for a whole programme is first wound as two film spirals 11 and 12 on the double spool 2. The ends of the film spirals 11 and 12 are joined together, if necessary they are spliced together before projection commences, and thereby form a loop, corresponding to the loop 5 of FIG. 2. This loop 5 is drawn off the spirals 11 and 12 in sufficient length to be threaded into the film projector 6, through the intermittent mechanism and sound track, play-back head thereof so leaving the film projector at 6', through the various film pulleys of the swing arm assembly 20 and back to the film spiral 11. The loop 7 consequently formed is secured against the hub of the double spool 8, the film 1 lying flat between the cheeks of double spool 8, in the position to form the two film spirals 13 and 14, as in FIG. 5, when the double spool 8 is rotated. It will be particularly appreciated, in the apparatus of FIG. 10, that both spools of the double spool 2 rotate in the same sense, so that both film spirals 11 and 12 unwind simultaneously, while both spools of the double spool 8 rotate together in the opposite sense, so that both film spirals 13 and 14 are wound simultaneously. Film 1 taken from spiral 12 passes through the film transport mechanism of projector 6, leaving the projector at 6' to be formed onto double spool 8 in film spiral 14. Film taken from spiral 11 does not pass through the projector 6 in the first part of the projection cycle but is would directly onto double spool 8 as film spiral 13. Initially, double spool 2 is controlled by torque motor 36 in the film pay-off sense, that is, the torque motor 36 provides an opposing torque to maintain the required film tension, while double spool 8 is driven by torque motor 37 in the film take-up sense. Winding in this sense continues until film spirals 11 and 12 are fully unwound, when film spirals 13 and 14 are fully wound. Both double spools stop rotation and, after a brief dwell, are both rotated in respective opposite sense, so that film spirals 11 and 12 are reformed and film spirals 13 and 14 are unwound. Film 1 from film spiral 13 now passes through the projector and is rewound as film spiral 11, so that the initial condition is restored with all the film would on double spool 2 and with double spool 8 empty. The cycle ends and when so desired, repeats, so that projection is continuous for so long as the apparatus is operated.

Figure 20:
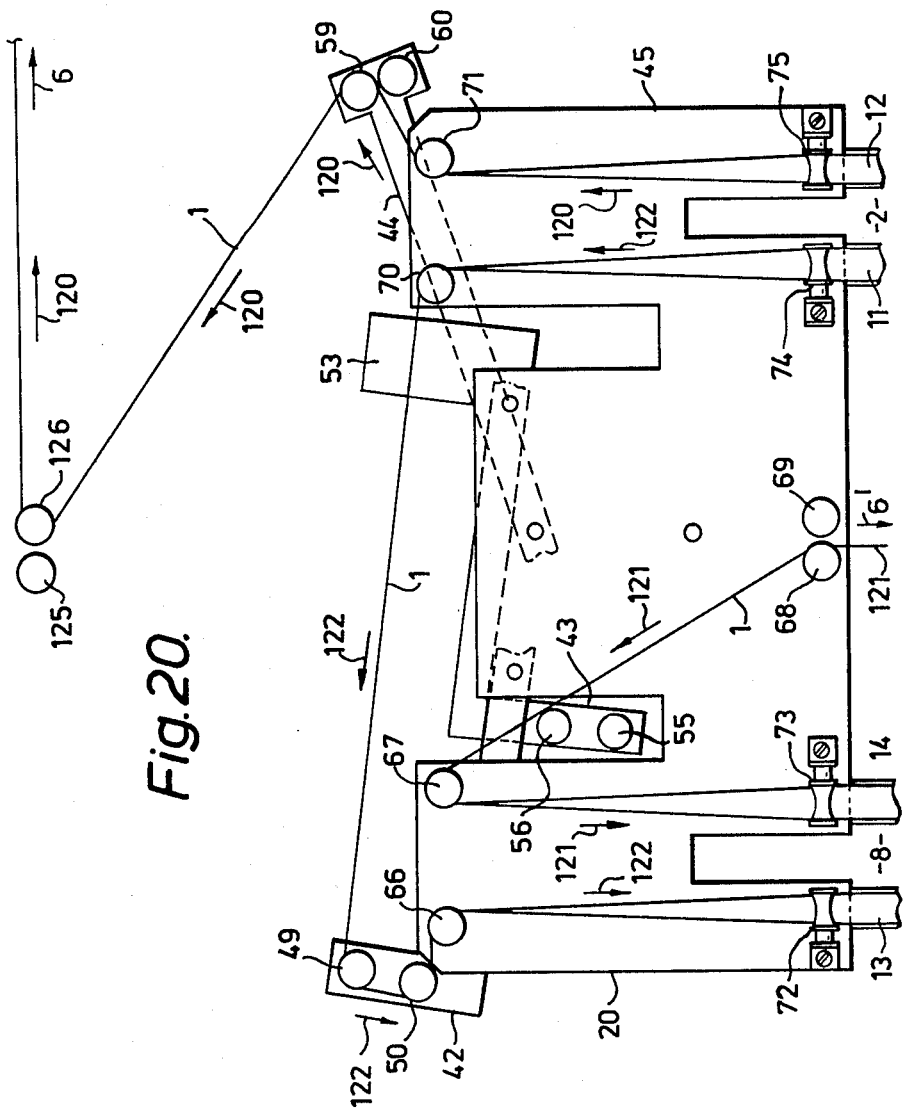

For detail description of the operation, it is immaterial which point of the continuous cycle of operation is taken as the start. However, it is convenient to describe the sequence from the point where the film loop 7 has been taken onto double spool 8 and double spool 2 has started to pay-off film while double spool 8 has started to take-up film. This arbitrary starting point is shown in the diagram of FIG. 20.

It will be understood, from the foregoing summarized description of operation, that there is a first point in the projection cycle where, both film spirals 11 and 12 being fully unwound, the loop secured on double spool 2 is drawn out and released and, momentarily later, ready for the reversal of rotation of double spool 8 for film pay-off therefrom, a new loop is formed and taken up on double spool 2, ready for rewinding the film spirals 11 and 12.

Correspondingly, time spaced-apart therefrom by one half the projection cycle duration, double spool 8 still unwinding film spirals 13 and 14, the loop 7 secured on double spool 8 is drawn out and released and, momentarily later, ready for the reversal of rotation of double spool 2 for film pay-off therefrom, a new loop is formed and taken up on double spool 8, ready for rewinding the film spirals 13 and 14.

The respective film loops are received from the swing arm assembly 20, secured against the core of the respective double spool and, finally, carried up to the swing arm assembly 20 for release, by means of the pick-up arm 90 of the respective double spools. The sequence of operations of the pick-up arm 90, double spool 2 being taken as example, will be described with reference to FIGS. 16 to 19. Comparing FIGS. 16 to 19 with FIGS. 14 and 15, used to describe the construction of the double spool 2, it will be noted that some of the references are omitted for simplicity.

Figure 14:
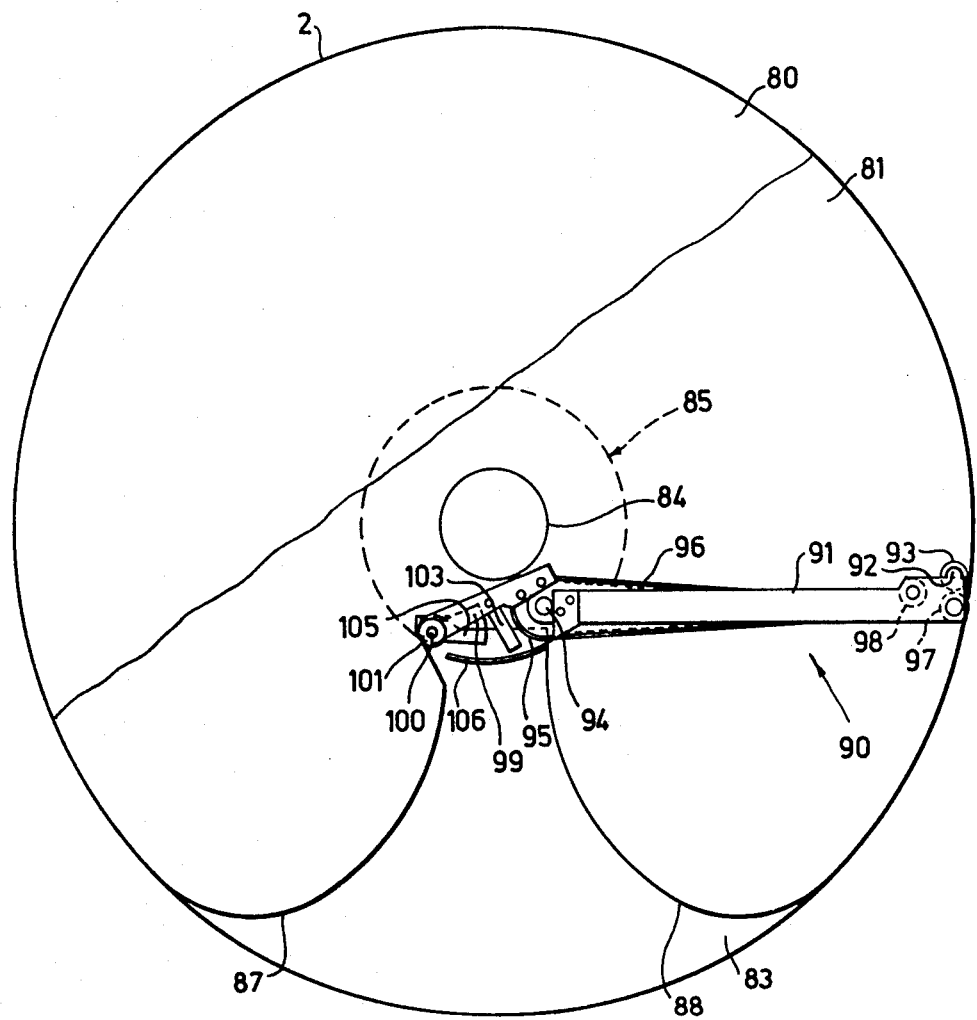
Figure 15:
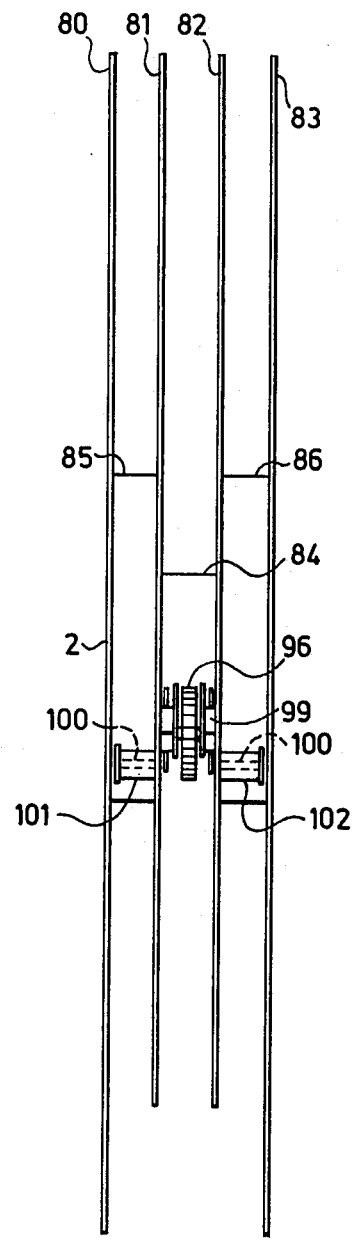
Figure 16:
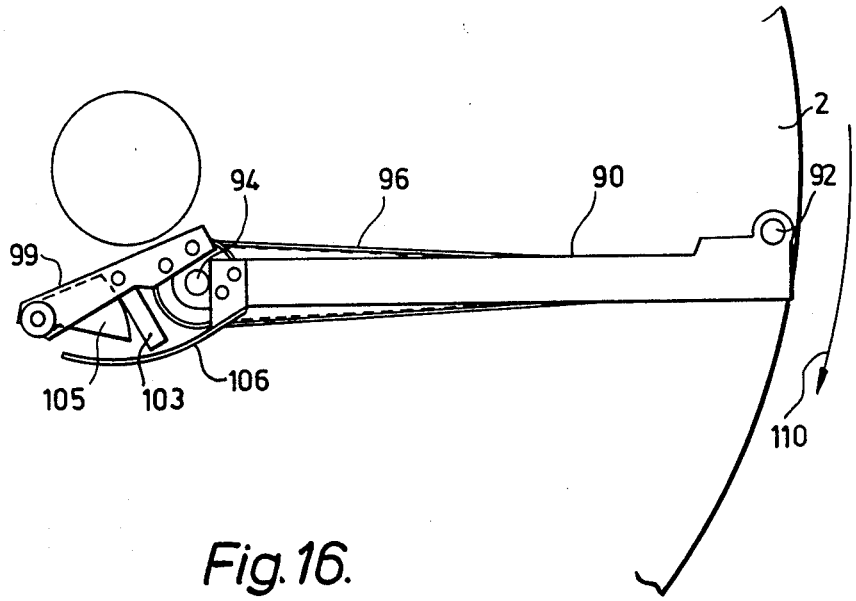
Figure 30:
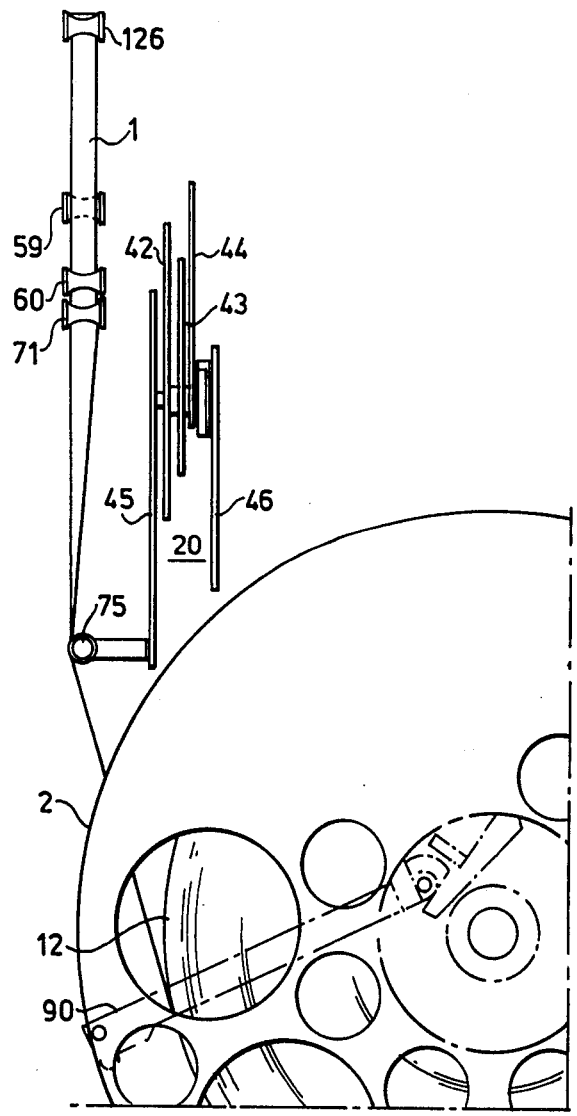

The partial views of FIGS. 16 to 19 correspond to the view of the double spool 2 of FIG. 14, the view of FIG. 11, and also the partial view of FIG. 30. When the film is fully would on the double spool 2 the pick-up arm 90 occupies the position of FIG. 14 and FIG. 16, that is, it lies between the two fully wound spirals 11 and 12, as shown in FIG. 30. When rotated for film pay-off, the double spool rotates in the clockwise direction, in the views of FIGS. 16 to 19, as shown by the arrow 110 in each figure.

Figure 17:
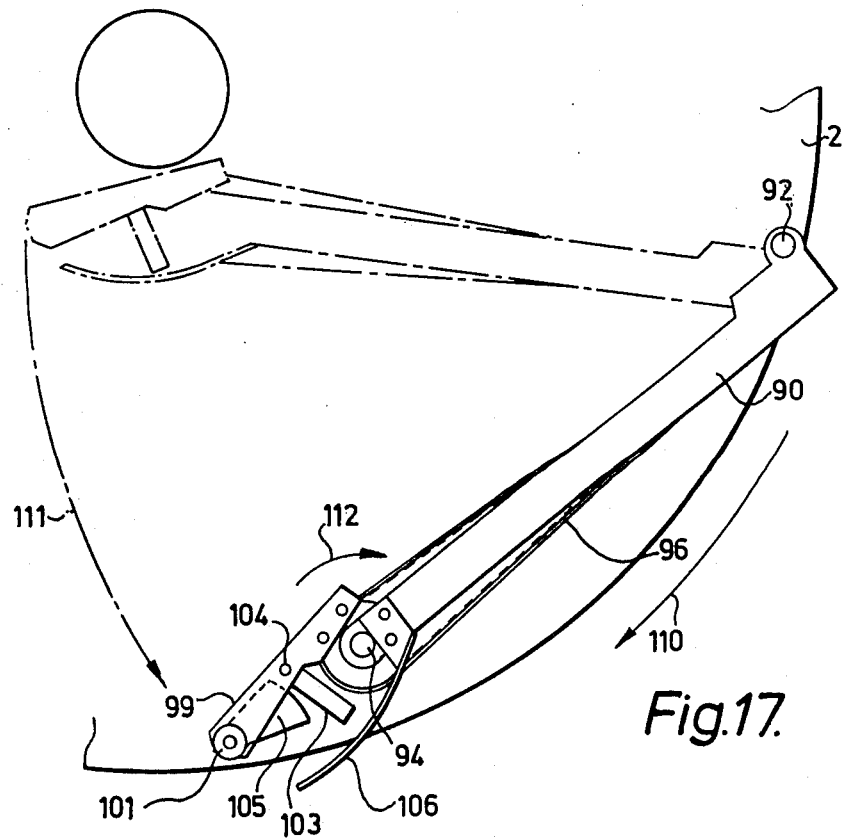

At the final moment of unwinding of film spirals 11 and 12, as the film loop is drawn off the double spool 2, the pick-up arm 90 pivots outwardly, in the anticlockwise sense, as shown by the arrow 111 in FIG. 17. As the pick-up arm 90 rotates about spindle 92 and relatively to pulley 93, FIG. 14, the belt 96 is driven to rotate pulley 95 on shaft 94 and so move the offset arm 99 in the clockwise sense as shown by the arrow 112, FIG. 17. Further clockwise rotation of double spool 2 brings the pick-up arm 90 into a tangential position relatively to the cheeks of double spool 2 and brings the offset arm 99 into substantial alignment with the pick-up arm 90, as shown in FIG. 18.

During all this time, the film loop is carried by the film loop retaining finger 103 and is securely held thereon by the film loop retaining cam 105. At this point, however, the film loop is drawn upwardly from the finger 103 so pivoting the finger 103 in the clockwise sense, as shown by the arrow 113, to its closed position in alignment with the offset arm 99. At the same time, the cam 105 is pivoted in the anticlockwise sense, as shown by the arrow 114 to a projecting position, as shown in FIG. 19.

At the point of rotation shown in FIG. 18, the rotation 110 of double spool 2 carries the pick-up arm 90 not only upwards but also to the right, as viewed in FIG. 18 and as shown by arrow 115. Thereby, the offset arm 99 is carried upwardly and onto the face plate 45 of the swing arm assembly 20. At this point, the rotation of double spool 2 is arrested, so that there is a dwell in the sequence of operations, the pick-up arm 90 and the offset arm 99 remaining stationary, momentarily, in the positions shown in FIG. 19, before the sense of rotation of the double spool 2 is reversed, drawing down the pick-up arm 90 with a reformed film loop, in the reverse sequence shown by FIGS. 19, 18, 17 and 16, in that order.

Between the positions of FIGS. 17 and 18, and immediately preceeding that of FIG. 18, the offset arm 99 engages with guide members attached to the face plate 45 of the swing arm assembly 20 and, at the end of the upward travel, engages with a releasable locking means, whereby the pick-up arm is held fixedly in relation to the swing arm assembly 20 during the dwell period. These guide means and releasable locking means may take a variety of forms, as will be evident to those skilled in the art, and form no part of the invention, as such. For clearness of the diagrams, these features are not shown in the drawings, except that the cam 105, when moved outwardly to the position shown in FIG. 19, forms one element of the releasable locking means.

Referring now to FIG. 20, which may be compared with FIG. 29, it will be noted that some reference numerals are omitted for simplicity. The swing arm assembly 20 is shown with the swing arms 42, 43 and 44 in the positions shown in FIG. 10. Double spool 2 is shown at the right of the figure and double spool 8 at the left. Film spirals 11 and 12 are indicated at the points where film 1 is leaving the spools 2. Film spirals 13 and 14 are similarly indicated at the points where film 1 is being taken up on spools 8.

The film 1 runs from film spiral 12, in the direction of arrows 120, over film pulleys 75, 71 and 59, in sequence. It then passes over film pulley 126 of a pair 125 and 126, also shown in FIG. 29, to the film projector 6. Film 1 runs from the film projector at 6' over a film pulley 127, see FIG. 29, and over pulleys 68, 67 and 73 in sequence, in the direction of the arrows 121, to form film spiral 14 on double spool 8.

Film 1 also runs from film spiral 11 over film pulleys 74, 70, 49, 50, 66 and 72, in sequence, in the direction of the arrows 122, to form film spiral 13 on double spool 8.

This condition continues during the projection of the whole of film spiral 12 and its rewinding to form film spiral 14 and the direct rewinding of the other half of the film length from film spiral 11 to form film spiral 13.

Figure 21:
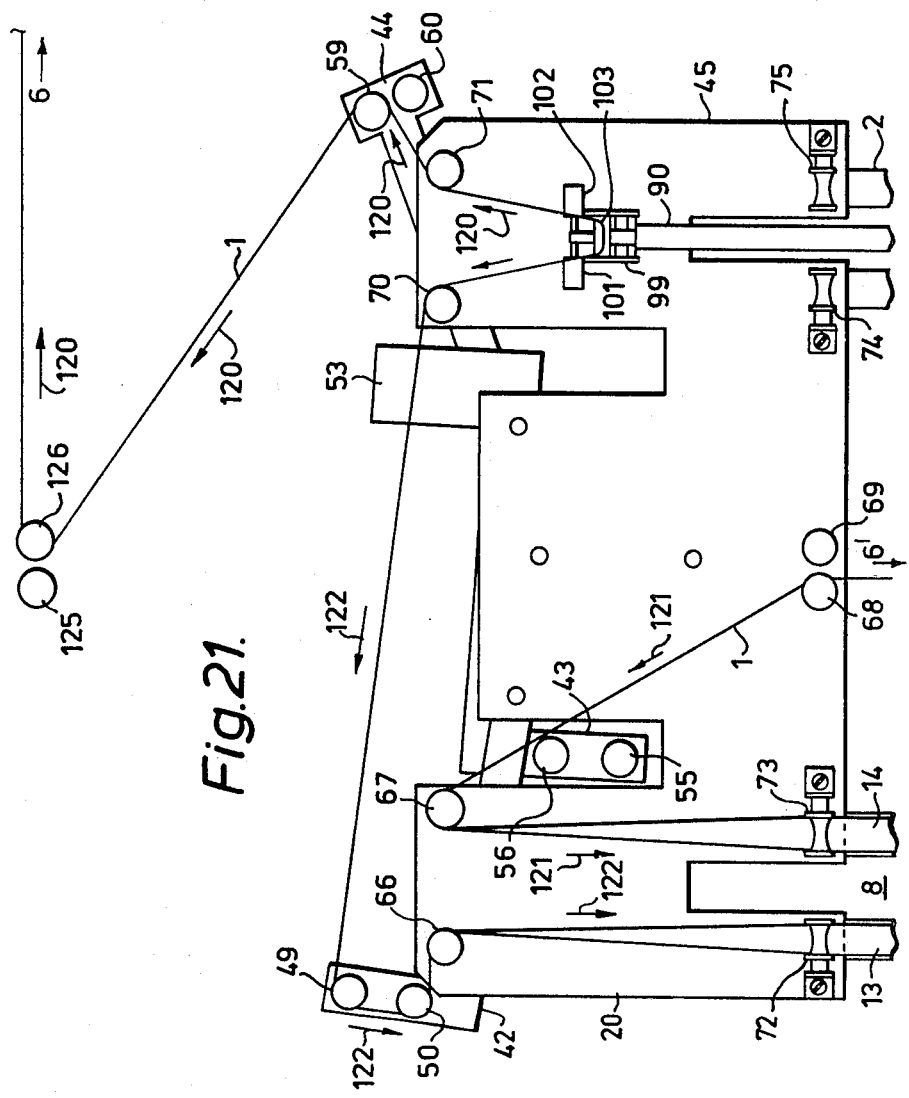

The near-completion of this part of the projection cycle is shown in FIG. 21. The pick-up arm 90 is shown in the position of FIG. 18, still travelling upwards, and the film loop still held by the film loop retaining finger 103, locked thereto by cam 105, not shown in FIG. 21. The film 1 has been taken off film pulleys 74 and 75 but still moves, in the direction of arrows 120 to the projector 6, in the direction of arrows 121 from the projector at 6' and, in the direction of arrows 122, from the film loop onto film spiral 13 on double spool 8.

Figure 22:
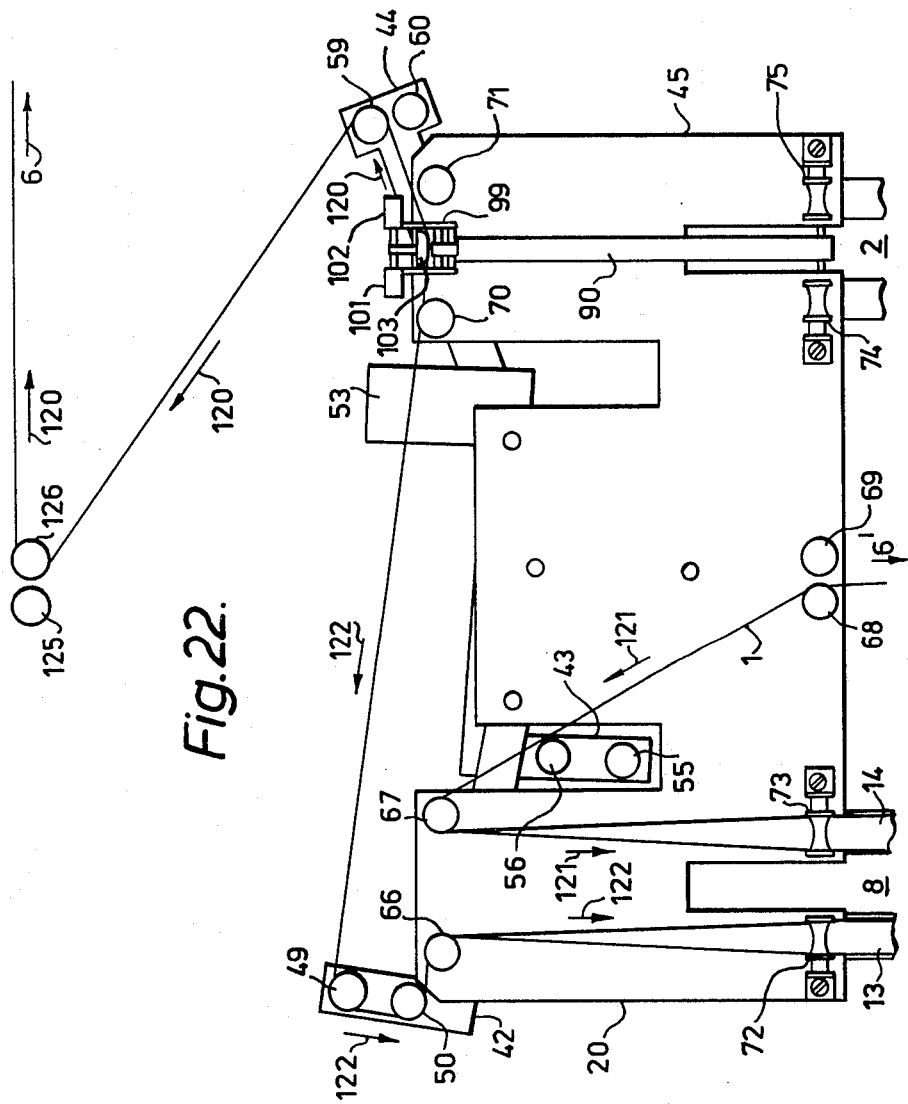

The completion of the unwinding from double spool 2 is shown in FIG. 22, in which figure the pick-up arm 90 is shown in the position of FIG. 19. The pick-up arm 90 has here reached its uppermost position and, with offset arm 99, is locked to the front plate 45 of the swing arm assembly 20. The film 1 has been picked off the film pulleys 70 and 71. The finger 103 off the offset arm 99 is at the point of being opened to release the film loop. The rotation of the double spool 2 has been arrested and the rotation of double spool 8 is about to be arrested prior to its reversal. The motion of film 1 continues to follow arrows 120, 121 and 122 and it will be noted that the path of the vanishing film loop now runs over film pulleys 49, (70), 59 and 126 solely.

Figure 23:
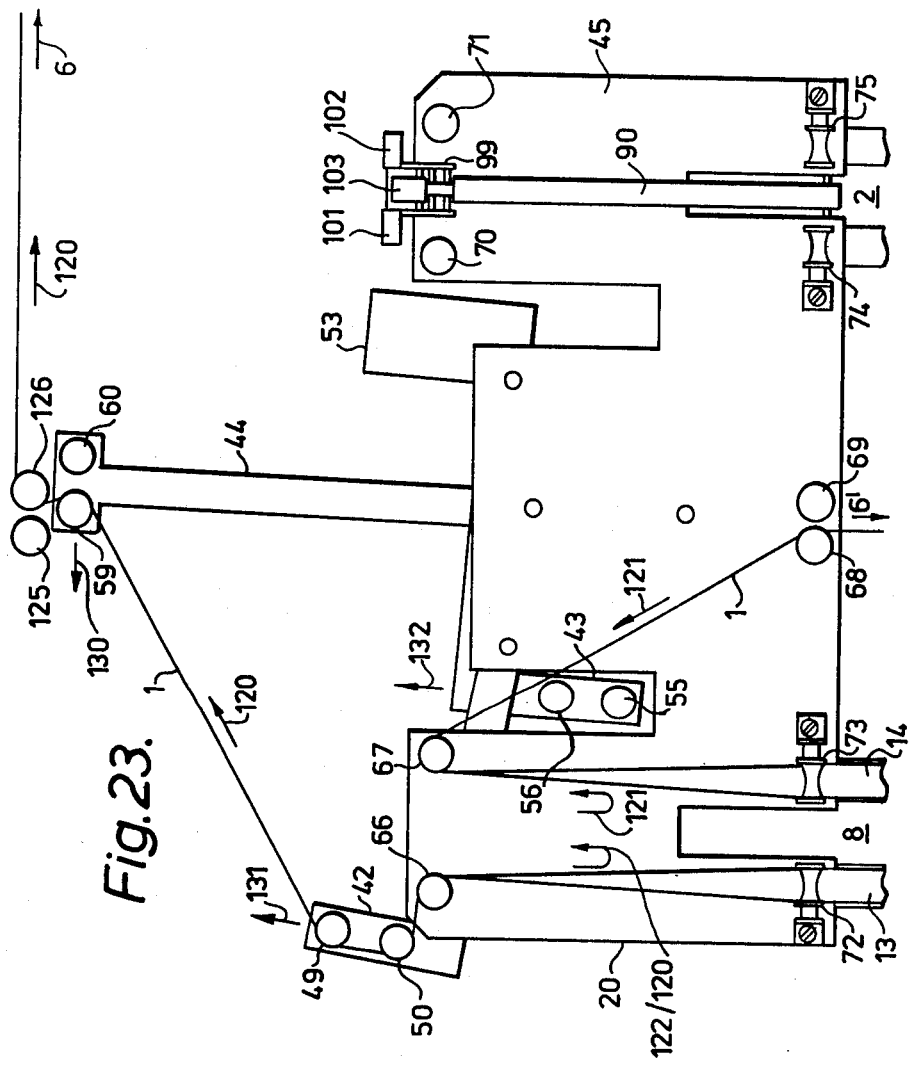

Referring, next to FIG. 23, it will be seen that the shortening film loop around film pulley 59 pivots arm 44 of the swing arm assembly 20 in the anticlockwise sense, as shown by arrow 130. Reference to FIG. 12 will show that rotation of pulley 62 drives the belt 63, so that arms 42 and 43 are simultaneously rotated in the counterclockwise sense, as shown by the arrows 131 and 132 respectively, of FIG. 23, after a slight delay due to lost motion provided.

In the diagram sequence of FIGS. 20 to 28, the dwell due to the lost motion in the drive is emphasised. Thus, in FIG. 23, arm 44 is shown moved to an upright position. Finger 103 has now released its film loop which has now almost vanished, the film 1 being about to transfer from pulley 59 to pulley 60. Arms 42 and 43 have not yet moved. Change of sense of rotation of double spool 8 is represented by the "U" arrows 122, 120 and 121.

Figure 24:
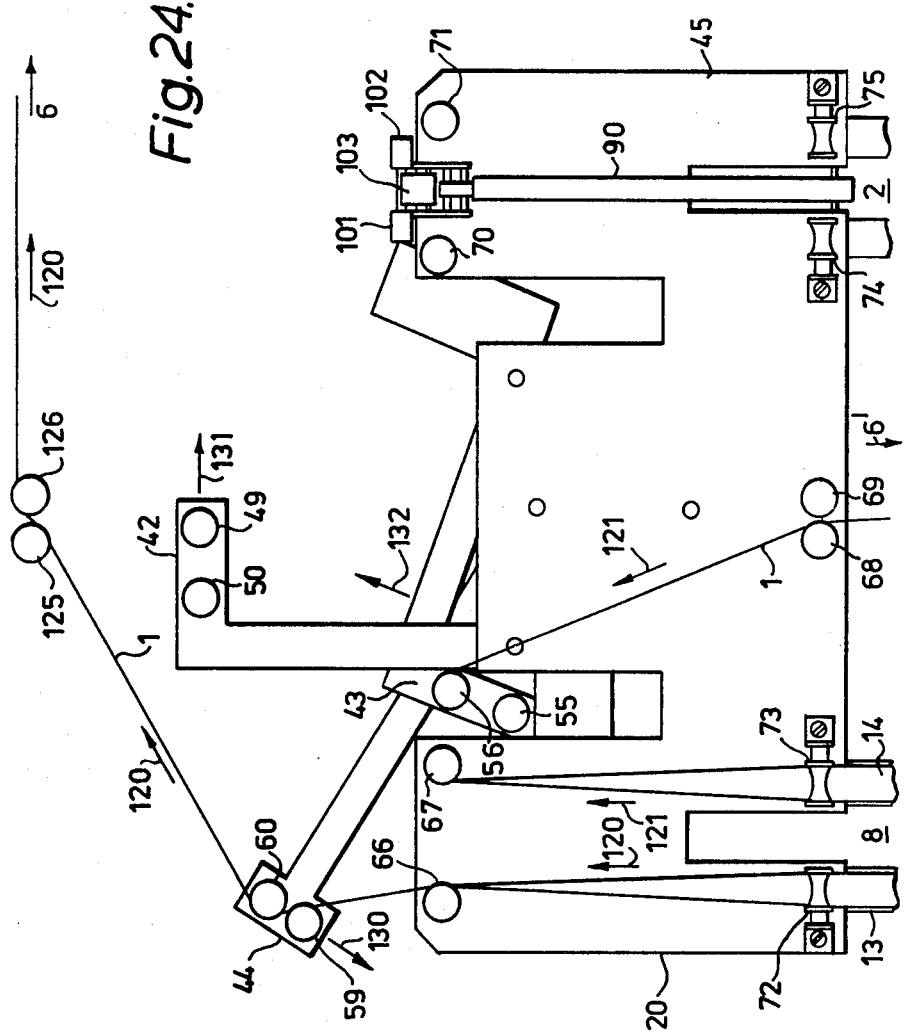

FIG. 24 shows arm 44 in continued movement to the left. Arm 42 has been rotated to the vertical position, see arrow 131, in which position film pulleys 49 and 50 have disengaged from the film 1, which film has been taken onto pulley 60 of arm 44. Arm 42 is now inoperative in relation to the film 1. Arm 43 has been rotated clockwise, see arrow 132, and film pulley 56 has picked up the film 1 to form a loop between film pulleys 67 and 68. Double spool 8 is now rotating in the pay-off sense, as indicated by arrows 120 and 121.

Figure 25:
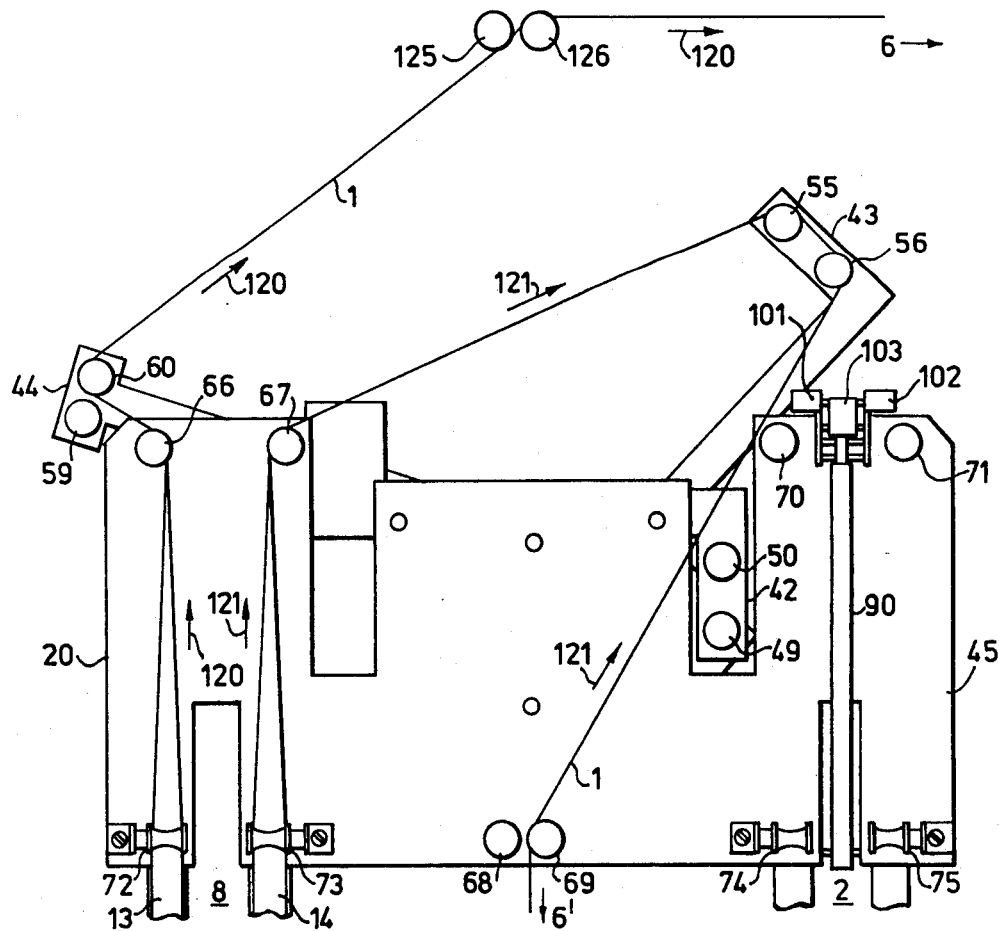

FIG. 25 shows arm 44 at the end of its travel, in which the film path runs over film pulleys 72, 66, 60 and between pulleys 125 and 126, as shown by arrows 120, to the projector 6. Inoperative arm 42 is similarly at the end of its travel. Arm 43 is shown, the film from the projector at 6' running over pulleys 56, 55, in sequence, to pulley 67, the arm 43 being about to lay the film over film pulleys 70 and 71. The finger 103 remains open to receive the film against its rounded surface. Double spool 8 continues rotation in the pay-off sense.

Figure 26:
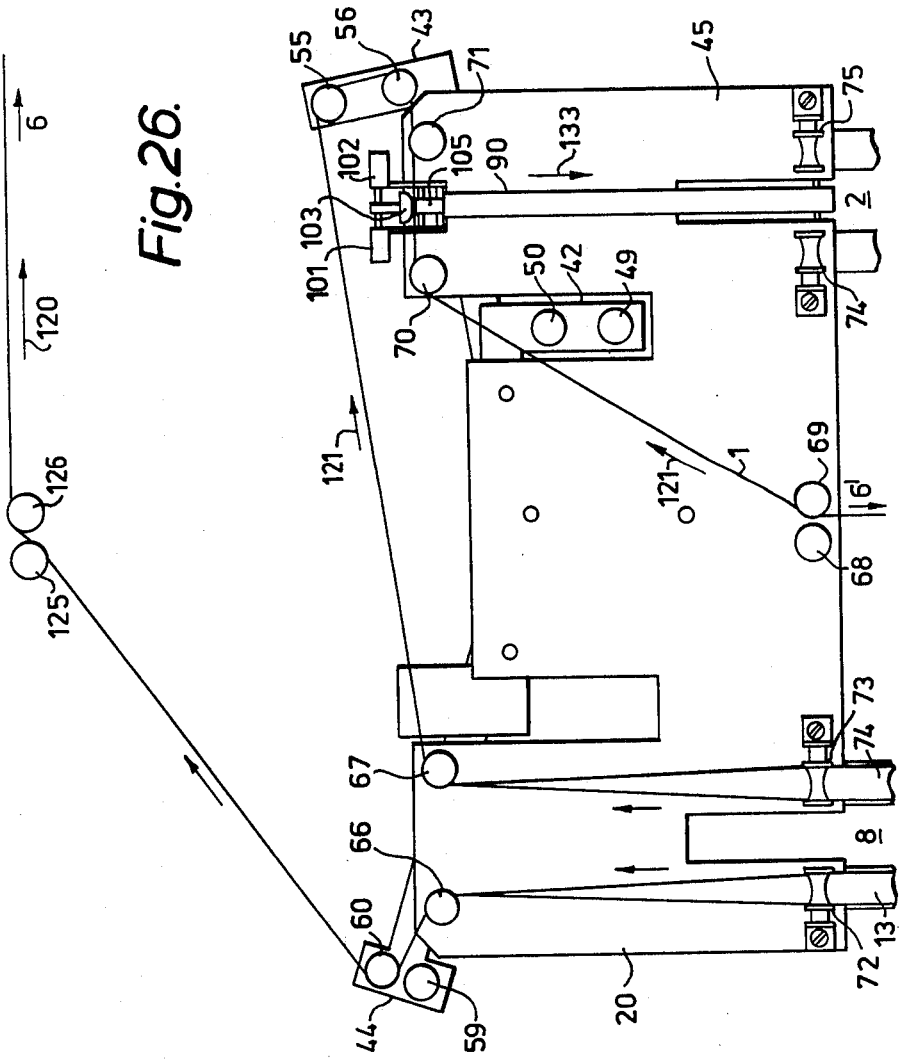

In FIG. 26, the film path from spiral 13 to the film projector 6 remains unchanged. Arm 43 has completed its rotation to the right. The rotation sense of double spool 2 has changed to the take-up sense. Finger 103 has moved to the closed position. The film is locked against finger 103 by cam 105. The pick-up arm 90 is about to move downwardly as shown by the arrow 133, to form a new film loop and transfer it to double spool 2.

Figure 27:
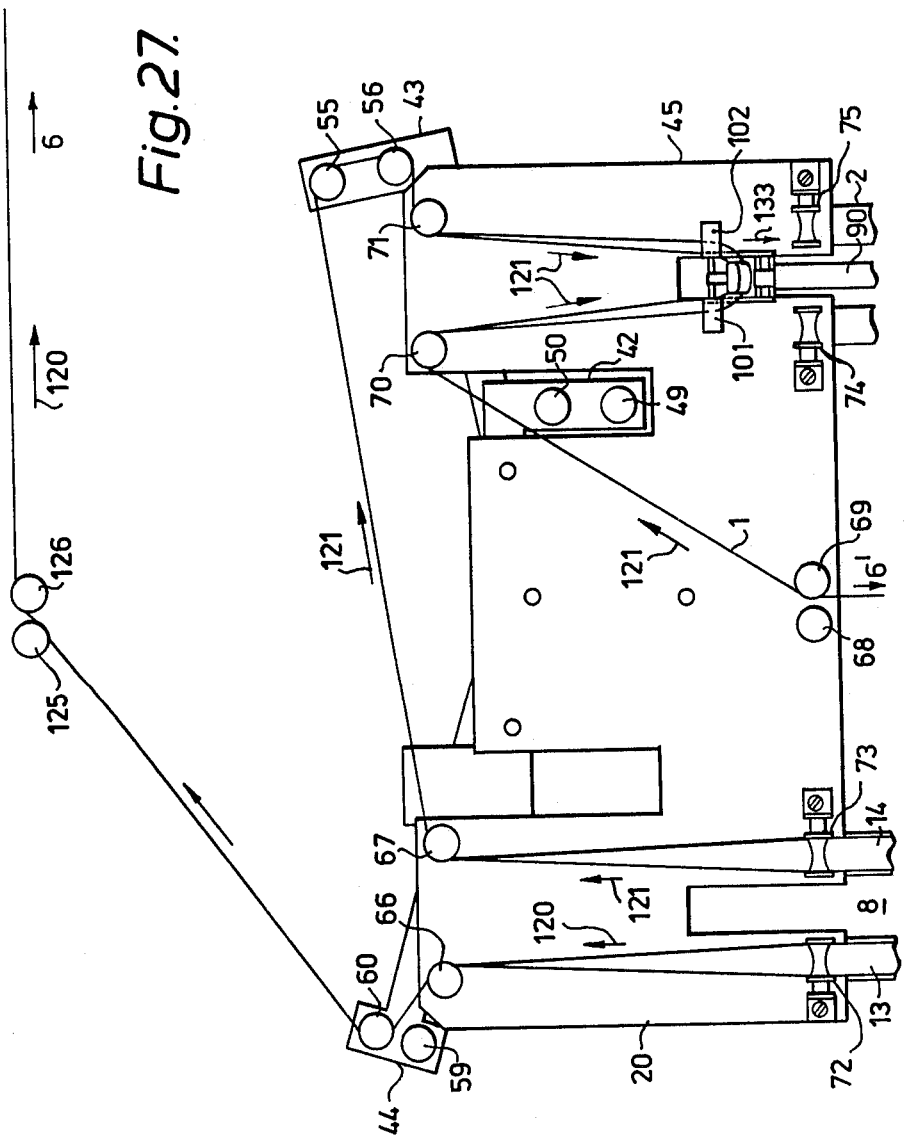

FIG. 27 shows the completion of this sequence, the arm 90 moving downwardly with the newly formed film loop in process of being laid flat over the film pulleys 101 and 102 and about to be drawn over pulleys 74 and 75, respectively.

The diagram sequence of FIGS. 20 to 27 has shown the first transition, at the end of one half of the film projection cycle, for which double spool 2 was rotated in the pay-off sense and double spool 8 was rotated in the take-up sense, and preceeding the second half of the film projection cycle, in which double spool 2 will be rotated in the take-up sense and the double spool 8 will be rotated in the pay-off sense. In this transition, as explained, the film loop held on double spool 2 was given up and a newly-formed film loop taken onto and secured to the double spool 2.

A corresponding, but reverse, transition occurs when the double spool 8 has been fully unwound. The film loop secured thereon is then taken from the double spool 8 and carried up to film pulleys 66 and 67 by the pick-up arm 90 of the double spool 8. The residual film loop is taken up in the directions of both arrows 120 and 121, that is it is taken from spiral 13 to the projector 6 and from the spiral 14 to spiral 12. The resultant film tension then moves arm 44 in the clockwise sense. Arm 42 simultaneously moves anticlockwise to pick up a film loop, from the film length between pulleys 70 and 69, upon pulleys 50 and 49, by which it is laid over pulleys 66 and 67. Arm 43 moves anticlockwise to disengage pulleys 55 and 56 from the film 1. This second transition is accompanied by reversal of double spool 2 from the film take-up to the film pay-off sense of rotation and by reversal of double spool 8 from the film pay-off to the film take-up sense of rotation. This second transition thus brings about the film feed and take-up conditions shown in FIG. 28 which, it will be seen corresponds exactly to the conditions of FIG. 20 prior to the first transition.

FIG. 29 further shows the swing arm assembly 20 with arms 42, 43 and 44 in the positions of FIG. 20 and FIG. 28.

FIG. 30 shows the path of the film 1 from spiral 12 of double spool 2, over those fixed and movable film pulleys seen in this view, to the projector positioned in front of the plane of the figure.

In summary, with reference to FIG. 29, and with the arbitrary starting point of double spool 2 spirals 11 and 12 fully wound, spiral 12 is fed to the projector 6 and then taken up on double spool 2 spiral 14. Simultaneously, spiral 11 is unwound and rewound directly as spiral 13. In the second half of the projection cycle, spiral 13 is fed to the projector 6 and then taken up on spiral 11 while spiral 14 is directly rewound as spiral 12, thereby restoring the arbitrary starting conditions with completion of the projection cycle. The entire film programme is then ready for the next performance and projection can be repeated indefinitely as required, no rethreading of the projector being necessary until the film programme is changed, for example to the film held ready on upper double spool 2'.

No strain is placed upon the film beyond that normal for direct reel-to-reel projection, except at the two transitions described, when the film loops are manipulated from and to the double reels. In the example described, the apparatus, and particularly the dimensions and motions of the swing arm assembly 20, are chosen to minimise strain on the film. However, film may at any point be carried over any conventional form of loop absorber, in order further to reduce film tension shock.

What I claim is:

1. An arrangement for spooling endless band materials, and for controlling the said band material during a transport operation by which the entire length of the said band material is transported past a fixed station, comprising a first double spool adapted to receive and hold a loop of the band material and to carry substantially the whole length thereof in two spirals of the band material laterally spaced-apart, a second double spool adapted to receive and hold a loop of the band material and to receive and carry the band material from the first double spool in two spirals of the band material laterally spaced-apart, motor means for controlling the first double spool for rotation in the pay-off sense of the band material wound thereupon during a first half of the said transport operation, and in the take-up sense during the second half of the transport operation, motor means for controlling the second double spool for rotation in the take-up sense for the band material during the first half of the said transport operation, and in the pay-off sense during the second half of the transport operation, a first system of band-supporting guide members fixed in position relatively to the first and second double spools, a second system of band-supporting guide members co-operating with said first system of guide members and movable with respect thereto from first positions during the first half of the said transport operation, to second positions during the second half of the transport operation, the said band-supporting guide members being positioned, in the first said positions of the movable guide system, for guiding said band material from a first said spiral on the first double spool to the said fixed station and from the fixed station onto a first spiral on the second double-spool and also for guiding said band material from the second spiral on the first double-spool onto a second spiral on the second double-spool, the said band-supporting guide members being re-positioned, in the second said positions of the movable guide system, for guiding said band material from the said second spiral on the second double-spool to the said fixed station and from the fixed station onto a second spiral on the first spool and also for guiding said band material from the first spiral on the second double-spool to a first spiral on the first double-spool.

2. An arrangement as claimed in claim 1, including loop holding means, for holding a loop of the said band material, movably attached to each of the first and second double-spools and movable from an open first position, occupied prior to the take-up drive of the respective double-spool, in which position the loop holding means is positioned to receive a portion of the band material extending between two band-supporting guide members of the said fixed system thereof, and movable from said open first position to a closed second position; being adapted in movement therebetween to form a loop of the band material, and the closed second position being such that the said loop of the band material is secured with respect to the corresponding double-spool in readiness for winding of the said two spirals of the band material during the said take-up drive of the double-spool.

3. An arrangement as claimed in claim 2, in which the said loop holding means includes an arm which is pivoted near the periphery of the double spool for movement to a tangential position with respect to the double spool in the open first position and for movement to a position between the said two spirals of band material in the closed second position.

4. An arrangement as claimed in claim 3 in which the said arm of the loop holding means carries band gripping elements and a pair of band-supporting guides for laying the band material in positions for forming the said two spirals.

5. An arrangement as claimed in claim 4, in which the double-spools each have core components with cut away portions to receive parts of the loop holding means, in the closed second positions thereof, and the said arm carries a pair of arcuate covers to complete the spiral-carrying surfaces of the core component.

6. An arrangement as claimed in claim 2, in which the band-supporting guide members of the said movable system are carried by a plurality of movable members mounted to occupy a first position during the pay-off drive of the first double-spool and to occupy a second position during the pay-off drive of the second double-spool.

7. An arrangement as claimed in claim 6, in which the band-supporting guide members of the said movable system are carried in pairs by a plurality of pivotable arms co-operating as a swing arm asssembly, having the band-supporting guide members of the said fixed system mounted on a stationary part thereof.

8. An arrangement as claimed in claim 7, in which a different one of said plurality of pivotable arms carries the band material, in movement to the said first position and second position, respectively, so that the band material is caused to extend between the said two band-supporting guide members of the fixed system thereof, in readiness to be received by the loop holding means of the respective double-spool.

9. An arrangement as claimed in claim 1, for spooling cinematograph film arranged as an endless loop and for controlling the film during transport through cinematograph film projection apparatus, in which the said fixed station is the projection gate of the film projector, the double-spools are dimensioned to carry the required length of cinematograph film and the band-supporting guide members are film supporting pulleys.

* * * * *